UNITED STATES PATENT OFFICE.

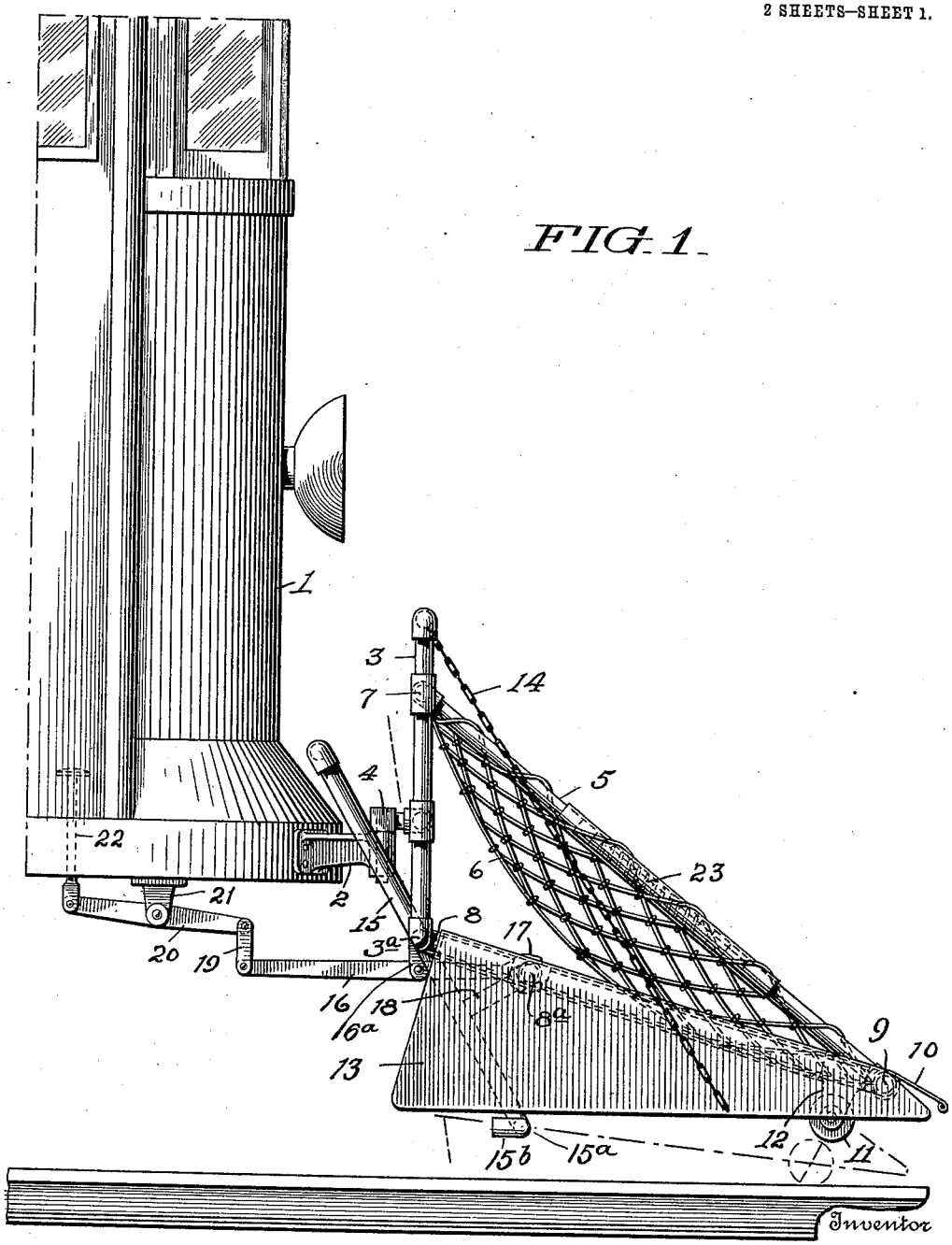

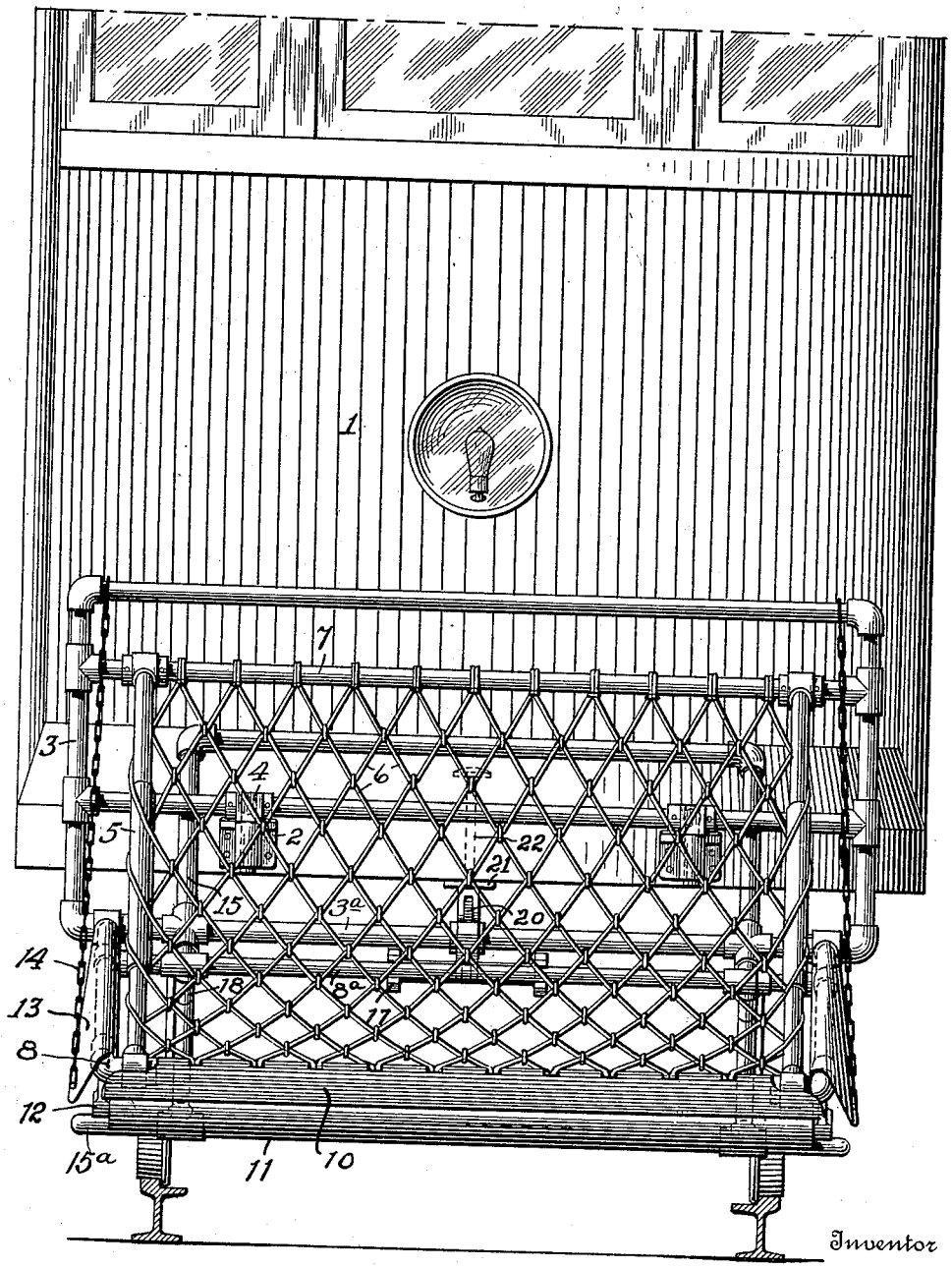

GEORGE H. MILLER, OF READING, PENNSYLVANIA, ASSIGNOR OF ONE-HALF TO EDWARD M. ADAMS, OF READING, PENNSYLVANIA.

CAR-FENDER.

1,001,877.     Specification of Letters Patent.     Patented Aug. 29, 1911.

Application filed May 6, 1911. Serial No. 625,511.

*To all whom it may concern:*

Be it known that I, GEORGE H. MILLER, citizen of the United States, residing at Reading, in the county of Berks and State of Pennsylvania, have invented certain new and useful Improvements in Car-Fenders, of which the following is a specification.

This invention relates to improvements in car fenders and the object is to provide a fender that can be readily removed from the car and one in which means are provided for lowering the fender bed as required.

A further object is to provide means for warding off objects from the sides of the fender, thus preventing a body from entering between the fender and the car body, and also, to provide a wheel guard, so that should a body for any reason, get beneath the fender, it will not come in contact with the wheels.

The invention consists of a frame, removably supported on the car body and having the usual resilient fender bed of woven cords, and means operated by the foot of the motorman for lowering the forward end of the fender to close proximity with the road bed. I also provide side guard plates which are pivotally mounted on the fender in such manner that the lowering of the fender frame will automatically cause these guard plates to move outwardly and upwardly, thus tending to ward off any object that might come in contact therewith. I also provide a wheel guard, in the form of a balanced frame, which will also be lowered before the wheels when the fender is lowered, thus protecting, from contact with the car wheels, any body that might by accident get beneath the fender.

The invention is more fully described in the following specification and clearly illustrated in the accompanying drawing, in which:—

Figure 1 is a side elevation of the forward end of a trolley car with my fender attached thereto. Fig. 2 is a front elevation of the same.

The numeral 1 designates the car and 2 the fender supporting brackets; 3 designates the rigid upright member of the fender, which is provided with engaging pins 4 for removably engaging the brackets.

The numeral 5 designates the main fender frame and it is provided with the usual coarse mesh fender bed of cord 6. This frame is pivotally secured to the rigid frame 3 near its top, and is adapted to swing on a cross-bar 7, which bar forms the upper section of the main frame.

The numeral 8 designates the supplemental or lower frame, and this is also pivotally secured to the upright rigid frame 3 at its lower end. The forward ends of the frame sections 5 and 8 are joined to the same cross-rod 9 and over this cross-rod I secure a plate or shield 10 extending the entire width of the fender. From the lower frame, at the forward end, I hang a roller 11, supported in brackets 12, which roller is preferably made of a soft or resilient material and adapted to contact with the road bed, and revolve, when the fender is lowered. On the side bars 8 of the lower frame I secure side guard plates 13. These plates are free to swing on the bars 8 and lie normally in almost vertical position. To the outer edges of the plates I secure chains 14 whose upper ends are secured to the rigid frame section 3. To the lower cross-bar $3^a$ of the rigid frame 3, I secure a balanced wheel guard 15, which normally lies at an angle with the lower end raised from the road bed. This guard consists of an approximately rectangular frame 15 whose bottom cross-member $15^a$ is formed with rearwardly turned ends $15^b$. To a bracket $16^a$ on the cross-bar $3^a$ I also secure the fender lowering apparatus, which consists of a lever 16 pivoted to the cross-bar and having jaws 17 at its forward end for engagement with the cross-bar $8^a$ of the lower frame. On the bar $8^a$ I also secure rods 18 which contact with the vertical end members 15 of the wheel guard. The rear end of the lever 16 is pivoted to one end of a link 19 whose opposite end is pivoted to a lever 20. This lever is pivoted to a bracket 21 on the car, and at its opposite end is engaged by a foot operated rod 22 extending through the car floor and in position for operation by the motorman.

When the foot rod 22 is depressed, it will raise the forward end of the lever 20 and through the bar 16 it will force the forward end of the fender down to the road bed, permitting the roller 11 to contact therewith. This action will also, through the rods 18, depress the wheel guard. When the fender frame lowers, the chains 14 will cause the outer ends of the side guard plates to move outwardly, thus tending to ward off any object that might come in contact therewith. The side rods 5 of the main section are provided with springs 23, against the tension of which the fender pulls when it is forced down by the motorman. When the pressure on the foot rod is removed, the springs will draw the forward end of the fender free from the road surface and the rods 18 will permit the lower end of the wheel guard to swing forwardly and upwardly, while at the same time the slackening of the chains 14 will permit the side guard plates 13 to assume normal position.

Having thus fully described my invention, what I claim and desire to secure by Letters Patent is:—

In a car fender, the combination with a car, of a rigid upright member, means thereon for removably securing it to the car, a main fender frame provided with a fender bed and pivotally secured at its upper end to the rigid member, a lower fender frame pivotally secured to the rigid member, the forward ends of the main and lower fender frame members being joined together, a guard plate at the forward end of the fender, a roller secured to the lower frame member, side guard plates pivotally secured to the lower frame member, chains engaging the free ends of the side guard plates and the rigid member, a wheel guard pivotally secured at its center to the rigid member, a lever pivoted to the rigid member and formed with jaws at its forward end for engagement with the lower frame member, means comprising a foot operated rod and lever for depressing the forward end of the fender and the wheel guard simultaneously, and springs for returning the movable parts to normal position when the foot rod is released.

In testimony whereof I affix my signature in presence of two witnesses.

GEORGE H. MILLER.

Witnesses:
 Ed. A. Kelly,
 J. O. R. Kelly.

Copies of this patent may be obtained for five cents each, by addressing the "Commissioner of Patents, Washington, D. C."